H. A. SCHERMERHORN.
SPRING WHEEL.
APPLICATION FILED FEB. 19, 1913.
1,066,228.
Patented July 1, 1913.
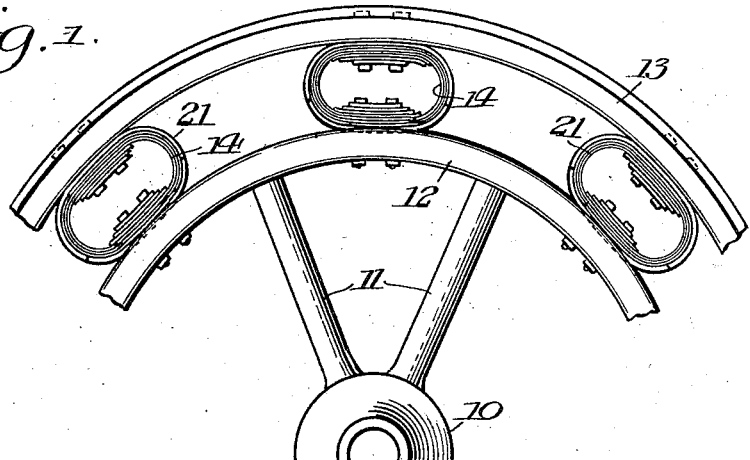
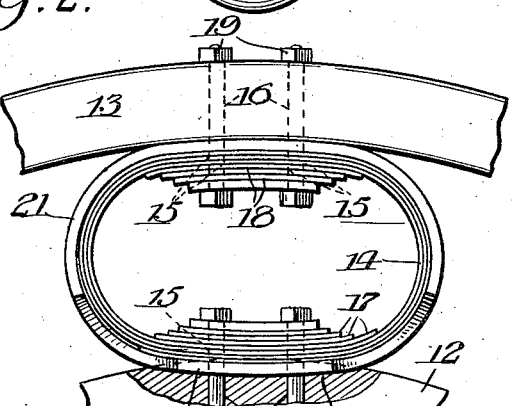
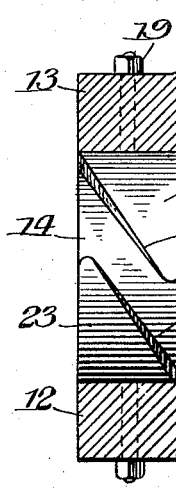
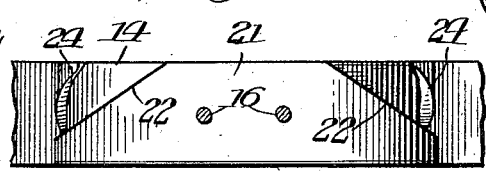
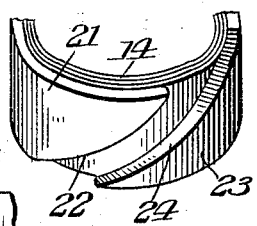
Witnesses
O. M. Wennich
A. S. Phillips
Inventor
Herschel A. Schermerhorn
by Chas. E. Tillman
Atty
COLUMBIA PLANOGRAPH CO., WASHINGTON, D. C.

UNITED STATES PATENT OFFICE.

HERSCHEL A. SCHERMERHORN, OF SHABBONA GROVE, ILLINOIS.

SPRING-WHEEL.

1,066,228.       Specification of Letters Patent.       Patented July 1, 1913.

Application filed February 19, 1913. Serial No. 749,322.

*To all whom it may concern:*

Be it known that I, HERSCHEL A. SCHERMERHORN, a citizen of the United States of America, residing at Shabbona Grove, in the county of Dekalb and State of Illinois, have invented certain new and useful Improvements in Spring-Wheels, of which the following is a specification.

My present invention relates to improvements in spring-wheels for vehicles; and is an improvement on or an addition or attachment to the invention in spring-wheels disclosed in Letters Patent No. 1,034,736, issued to me on the 6th day of August 1912, and has for its objects the same as those set forth in said patent, with the additional object or advantage, to increase the efficiency of the construction of the wheels shown in said patent, and to provide means for reinforcing or strengthening the character of springs therein disclosed whether used in connection with such wheels or otherwise, as well as, to render their breakage, under the most severe strains almost an impossibility, and when said springs are used in connection with the wheels of an automobile, where great strength and durability are required, they will in conjunction with the parts of the wheels, afford even or uniform resiliency over rough country roads.

In the present invention the construction of the springs proper, and their relation to the rim and tire of the wheel, are substantially identical with that set forth in said patent, but I have found by practical use, such springs require reinforcing or strengthening to remove all possibility of their breaking under the intense strain to which they are subjected in sudden movements of the vehicle or automobile, and I accomplish this end by a simple yet very effective improvement, attachment or addition to each of the springs, and will now proceed to describe the same.

Referring to the accompanying drawings, which serve to illustrate the invention—Figure 1 is a view in side elevation of a portion of a wheel embodying the invention; Fig. 2 is an enlarged view, partly in section, and partly in elevation, showing a portion of the rim and tire of the wheel with one of the springs embodying the improvement interposed therebetween and secured thereto; Fig. 3 is a view in elevation of one end of one of the springs showing the rim and tire in cross section; Fig. 4 is a plan view of one of the springs, showing it secured to a portion of the rim; and Fig. 5 is a fragmental perspective view of one of the springs.

Corresponding numerals of reference refer to like parts throughout the different views of the drawing.

The reference numeral 10, designates the hub of the wheel, from which radiate spokes 11, of the ordinary or any preferred construction, to the outer ends of which is secured in any suitable manner the rim 12, of the wheel, which rim may be of any suitable material and of any well-known construction. Surrounding the rim 12, at a distance therefrom is the tire 13, which may be of any suitable material and construction, but preferably of metal.

Located between the inner surface of the tire 13, and the outer surface of the rim 12, are a series of springs 14, each of which is preferably formed of a single piece of resilient material or sheet steel, which piece is provided with openings 15, arranged in pairs, as shown in Fig. 2, so that when the strip out of which each spring is formed is curved, said pairs of openings will register with the openings in the adjacent layer of the strip or piece, to the end that bolts 16 may be passed through said openings so as to secure the layers of each spring together. The bolts 16 are also passed through suitable openings in the rim 12, and tire 13, thus securing the spring 14 in position between the rim and tire, as is clearly shown in Figs. 1, 2 and 3 of the drawing.

Located on the inner surface of each of the springs 14, adjacent to the rim 12, are one or more metal plates 17, through which the bolts 16 are passed, and located on the inner surface of each of the springs 14, adjacent to the tire 13, are one or more metal plates 18, provided with suitable openings in which the bolts 16 in said tire pass, said plates being secured by means of nuts 19, while the bolts 16, which are extended through the plates 17 and rim 12, are held in position by means of nuts 20, or otherwise. By this arrangement of the continuous strip, out of which each of the springs 14 is formed, and the location of the plates 17 and 18, on the inner yet opposite surfaces thereof, it is evident that the springs 14, will assume and maintain an elongated or elliptical shape between the rim 12, and tire 13, which will afford great strength, durability and resiliency, and that as said plates and layers of the springs are bolted to the tire and rim by means of bolts arranged in pairs, any lateral movement of the tire with respect to the rim will be prevented. In other words, the tire will be yieldingly held in the same plane with the rim.

To render the springs stronger and so as to be less liable to break under the great stress or strain to which they are or may be subjected by the sudden movements of the vehicle, I place on the outer surface of each of the springs 14, and between it and the tire 13 a reinforcing spring plate 21, which, as shown in the different views of the drawings, is curved to correspond with the shape of that portion of the spring which it embraces. Each of these spring plates 21, is cut away on one of its edges as at 22, (see Figs. 3, 4 and 5) and said cut-away portions extend from each end of the spring plate 21, diagonally across the spring 14 to points at suitable distances from the middle of said plate.

Located on each of the springs 14, between the same and the rim 12, is a spring plate 23, each of which is formed with a cut-away portion 24, which portions extend from the ends of the plate 23, diagonally across the spring 14, to points at suitable distances from the middle of the plate 23. As is clearly shown in Figs. 3, 4 and 5 of the drawings, the cut-away parts 22 and 24 of the spring plates 21 and 23 respectively lie in substantial parallelism with each other, but are inclined in opposite directions, and it will also be seen by reference to said figures of the drawings, that the ends of the spring plates 21 and 23 are located near the edges of the spring 14, and by preference slightly overlap each other.

Each of the plates 23, like each of the plates 21, is curved to conform to that portion of the spring 14 which it embraces, and by reference to Fig. 2, it will be seen that the spring plate 23, is bellied outwardly at its central portion, and for the accommodation or reception of this bellied or outwardly curved part of the spring plates 23, the rim 12 is provided at suitable points on its outer periphery with concave recesses 25, in which the spring plates 23, will nest or rest at the portions thereof which are in contact with the rim. On account of the curve of the inner periphery of the tire 13, which curve corresponds substantially with the curves of the spring plates 21, these recesses are not necessary on the tire. Of course it will be understood that the bolts 16 are extended through suitable openings in the spring plates 21 and 23, which openings register with the openings in the springs 14 and plates 17 and 18, which plates are by preference slightly resilient.

Having thus fully described my invention what I claim as new and desire to secure by Letters Patent is—

1. In a spring wheel, the combination with a rim and tire, of an elliptical spring interposed between the same, a plurality of plates located on the inner surface of the spring adjacent to the rim, a curved spring plate located on the outer surface of the spring adjacent to the rim, a plurality of plates located on the inner surface of the spring adjacent to the tire, a curved spring plate located on the outer surface of the spring adjacent to the tire, each of said outer plates having edges on each side of its middle oppositely and diagonally extended across the spring, and means for securing said plates and spring together and to the rim and tire.

2. In a spring wheel, the combination with a rim, of a tire surrounding the same at a distance therefrom, a plurality of elongated springs interposed longitudinally between said rim and tire, a plurality of plates located on the inner surface of each of said springs adjacent to said rim, a curved spring plate located on the outer surface of each of said springs adjacent to the rim, a plurality of plates located on the inner surface of each of said springs adjacent to the tire, a curved spring plate located on the outer surface of each of the springs adjacent to the tire, each of the said outer plates having edges on each side of its middle oppositely and diagonally extended across the springs, a plurality of bolts extended through that portion of each of the springs adjacent to the rim and through the plates on said portion and engaging the rim, and a plurality of bolts extended through that portion of each of said springs adjacent to the tire and through the plates located on said portion of the springs and engaging the tire.

HERSCHEL A. SCHERMERHORN.

Witnesses:
CHAS. C. TILLMAN,
A. S. PHILLIPS.